United States Patent [19]

Linville et al.

[11] Patent Number: 5,403,641
[45] Date of Patent: Apr. 4, 1995

[54] REINFORCED SAILCLOTH

[75] Inventors: James C. Linville, Rowayton, Conn.; James M. McGhee, Warwick, R.I.; Lawrence F. Ellis, Putnam, Conn.

[73] Assignee: Dimension Polyant Sailcloth, Inc., Putnam, Conn.

[21] Appl. No.: 732,418

[22] Filed: Jul. 18, 1991

Related U.S. Application Data

[63] Continuation of Ser. No. 352,735, May 16, 1989, abandoned.

[51] Int. Cl.6 .......................... B63H 9/04; B32B 5/02
[52] U.S. Cl. .................................. 428/113; 114/103; 428/229; 428/232; 428/239; 428/252; 428/294; 428/302; 428/902
[58] Field of Search ............... 428/246, 294, 297, 229, 428/232, 239, 252, 302, 902; 114/103

[56]  References Cited

U.S. PATENT DOCUMENTS

| | | |
|---|---|---|
| 3,360,410 | 12/1967 | Romainin . |
| 3,644,165 | 2/1972 | Chen . |
| 4,444,822 | 4/1984 | Doyle et al. . |
| 4,554,205 | 11/1985 | Mahr . |
| 4,679,519 | 7/1987 | Linville . |
| 4,708,080 | 11/1987 | Conrad . |
| B14,708,080 | 9/1990 | Conrad . |
| 4,945,848 | 8/1990 | Linville . |
| 5,001,003 | 3/1991 | Mahr . |

FOREIGN PATENT DOCUMENTS 2193154  6/1986  United Kingdom .

Primary Examiner—James D. Withers
Attorney, Agent, or Firm—St. Onge Steward Johnston & Reens

[57] ABSTRACT

A reinforced laminated cloth is provided comprising outer layers of material having sandwiched therebetween a layer of reinforcing material, the layer of reinforcing material preferably comprising first and second layers of parallel spaced apart strands of stretch resistant material inclined at an angle to one another. In another aspect, the invention comprises a method for the preparation of a reinforced laminated cloth comprising feeding first and second webs of material towards a nip roll, coating the surface of at least one of the webs with adhesive, feeding reinforcing strands between the first and second webs, each of the reinforcing strands preferably being passed through one of a plurality of apertures located on a continuously moving endless belt disposed transversely to the direction of movement of the first and second webs, and continuously passing the first and second webs and the reinforcing strands through the nip roll. In yet another aspect, the invention comprises an apparatus for carrying out the method of the invention.

19 Claims, 6 Drawing Sheets

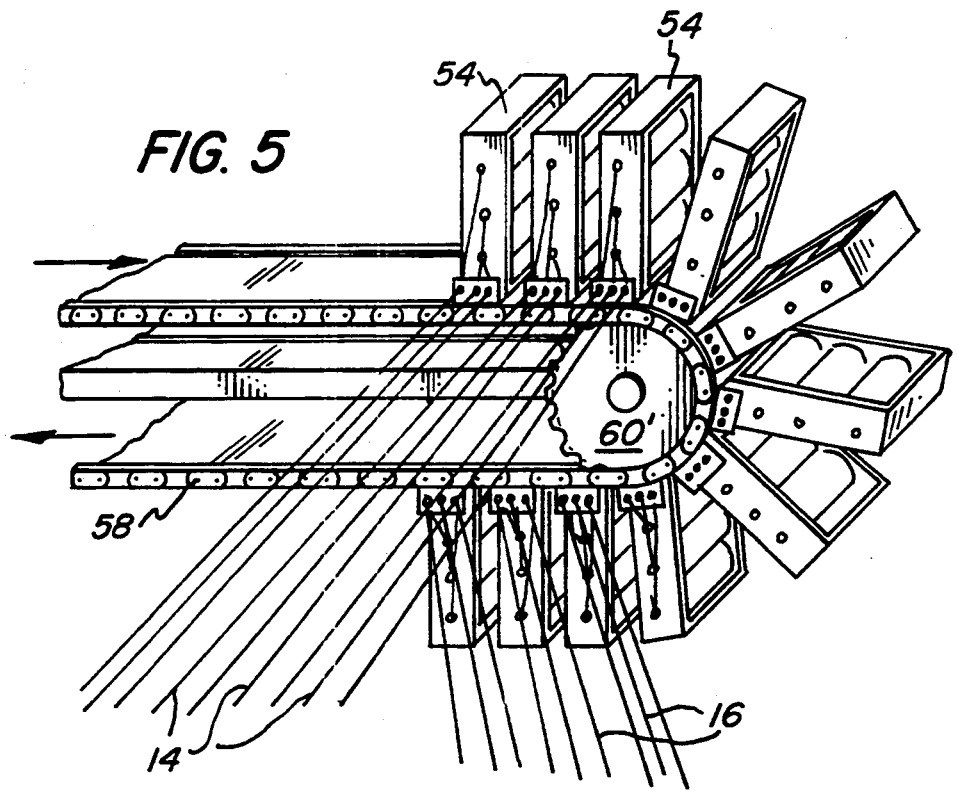
FIG. 5
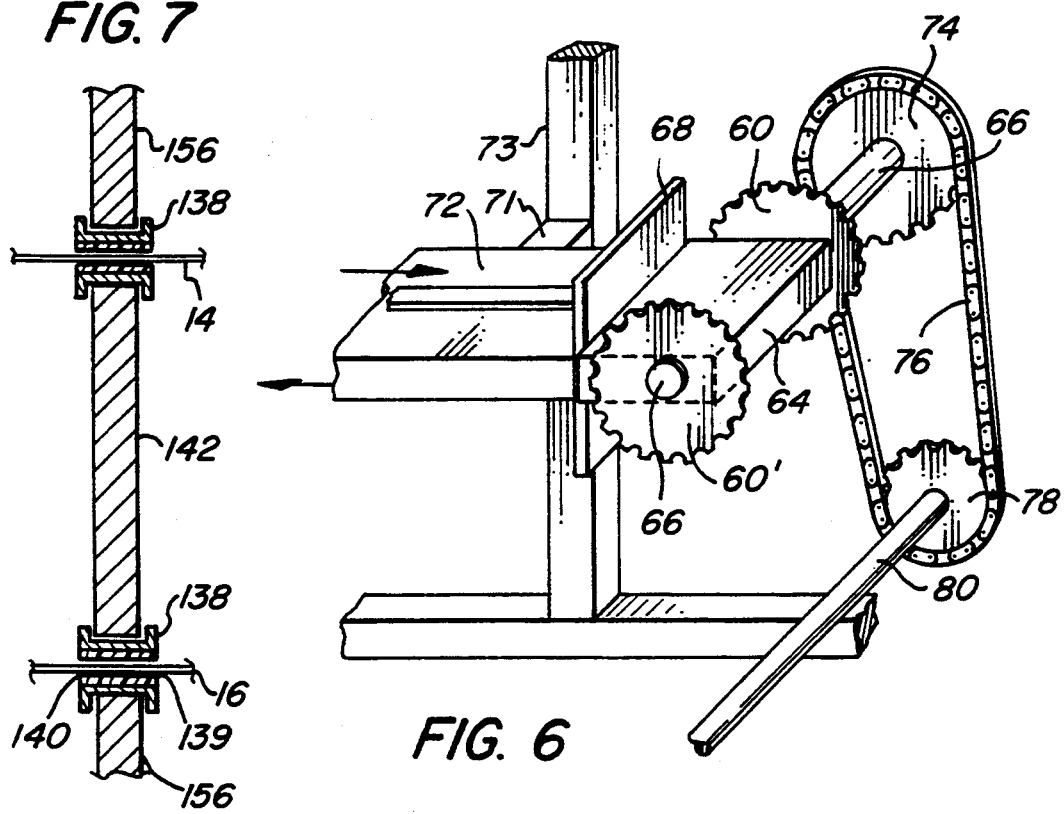
FIG. 7
FIG. 6

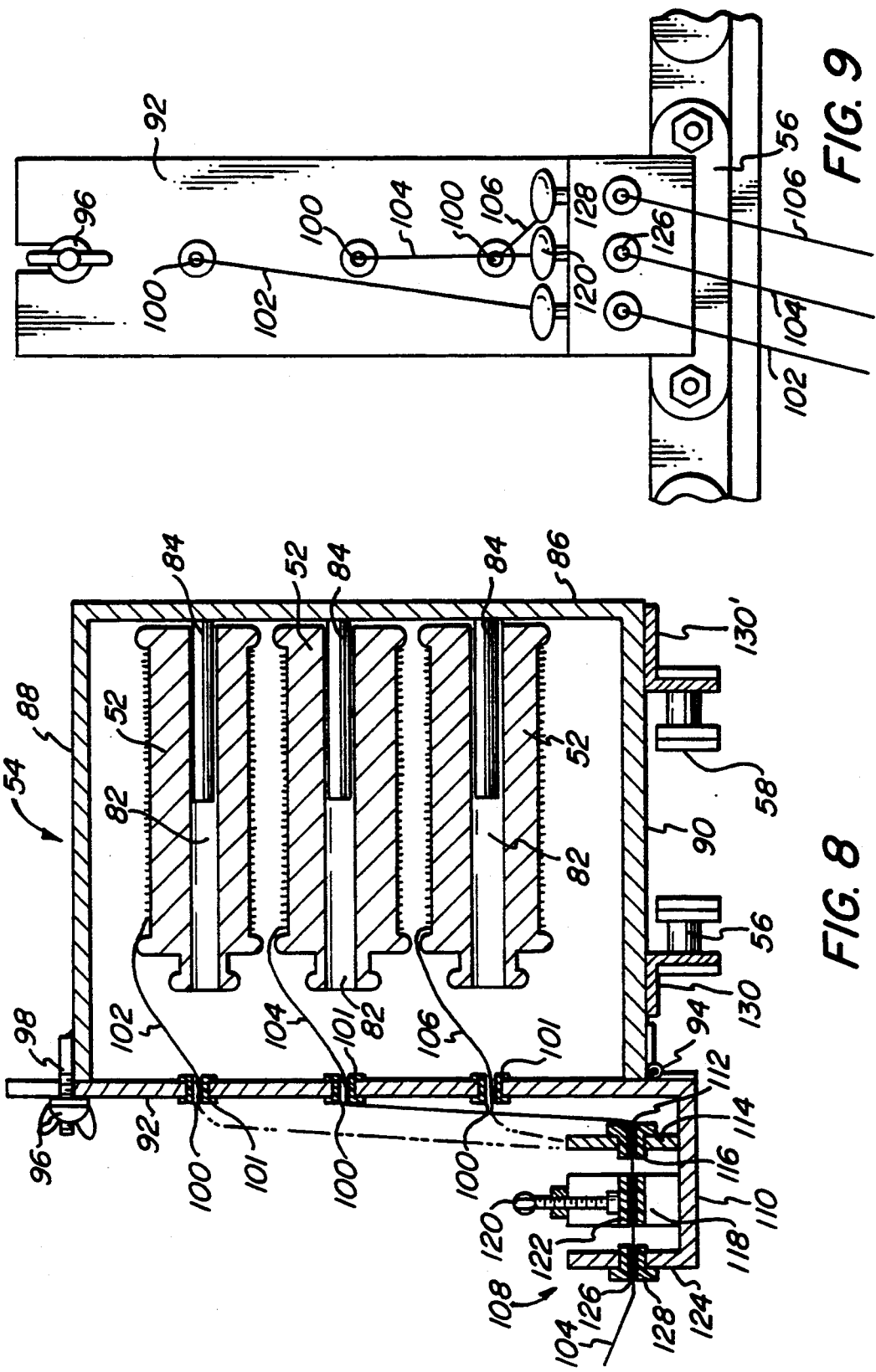

REINFORCED SAILCLOTH

This is a continuation of application Ser. No. 07/352,735, filed on May 16, 1989, now abandoned.

BACKGROUND OF THE INVENTION

This invention relates to reinforced cloths and methods for their fabrication and is more particularly concerned with improvements in reinforced sailcloth and methods for the preparation thereof.

DESCRIPTION OF THE PRIOR ART

Significant advances have been made in recent years in the construction of lightweight sails having high stretch resistance and strength and particularly adapted for use in racing competitions. Sailcloth representative of the present state of the art is designed to have extremely high stretch resistance and strength in one principal direction and yet possess sufficient stretch resistance and strength in other directions to permit handling of loads imposed on the sail by stresses in directions other than the aforesaid principal direction. The sailcloth of this type is assembled into a sail by uniting a series of panels of the cloth in such a way that the principal direction or axis of the cloth which possesses the high stretch resistance and strength is oriented in the direction in which the major stresses will be placed on the sail when in use.

Sailcloths having the above characteristics are prepared in general by bonding together, in the form of a laminate, a stretch resistant film of synthetic polymer such as the polyester (polyethylene terephthalate) film which is available under the trademark Mylar ® from DuPont Company, and a substrate which takes the form of a substantially orthogonal combination of warp and fill yarns in a scrim taffeta or warp knit. One of the courses of yarns (warp or fill) in this substrate is intended to bear the major load which will be exerted on the finished laminate and therefore consists of a high stretch resistant and high tensile modulus fiber such as a high tensile modulus polyester or polyamide. A particularly desirable fiber is that fabricated from the aromatic polyamide available from the DuPont Company under the trademark Kevlar ®. The other course of yarn serves to hold the fabric together (except in the case of warp-knits where the knit yarn performs this function) as well as providing tear strength, burst strength and seamability or the ability of the resulting cloth to be joined to abutting strips by means of stitched and/or adhesively bonded seams.

The layers of material in the above laminates are bonded to each other throughout their entire interfaces by means of synthetic resin adhesives such as polyurethanes, cross-linked polyester thermosets and the like.

A particular example of the above type of laminate is that described in U.S. Pat. No. 4,444,822 in which a film of stretch resistant synthetic resin film is bonded to an unwoven, warp-knit scrim. The latter comprises a system of spaced parallel strands, the strands in one layer crossing the strands in the other layer and the crossing strands in the two layers being tied together by means of a knit strand. The strands are fabricated from polymeric fibers such as polyester, polyamides and the like.

However, the use of such warp-knit scrims and other related warp-knit or woven fabrics gives rise to a number of problems. The over/under yarn pattern present in taffetas or scrims or the misalignment of the tie yarns in warp-knits can give rise to crimps in the load bearing yarns of the resulting laminates, thereby detracting from the desired stretch resistance and strength in the load-bearing axis of the laminate. Further, the warp-knits or woven fabrics produced from high stretch resistant fibers such as those from polyesters and polyamides, especially the preferred polyamides such as the aromatic polyamides of which that available under the trademark Kevlar ® is particularly preferred, are relatively expensive to produce and add significantly to the cost of the laminates into which they are incorporated.

In U.S. Pat. No. 4,679,519 to Linville issued Jul. 14, 1987, there is described a flexible reinforced laminate which is free from the various drawbacks set forth above and has proved eminently satisfactory in the fabrication of many types of lightweight sails having high strength and stretch resistance in predetermined directions in the sail as well as imparting stretch resistance and tear strength in other directions in the sail.

Various other means of providing lightweight reinforced sails have been described recently. Illustratively, Conrad U.S. Pat. No. 4,593,639 describes a method of constructing a sail which comprises applying reinforcing members to the surface of an appropriate skin such as Mylar ® or like material. The reinforcing members, which can be threads of stretch resistant material such as Kevlar ® are aligned in the direction of the principal stresses which will be sustained by the sail when exposed to the force of the wind. Variations of this concept are described in related Conrad U.S. Pat. No. 4,624,205, which issued on a continuation-in-part of the application on which the '639 patent issued, and in related Conrad U.S. Pat. No. 4,702,190 which issued on a continuation-in-part of the application on which the '205 patent issued.

Conrad U.S. Pat. No. 4,708,080 shows a sail fabricated from a plurality of individual panels, each of which is fabricated from a laminate having at least two layers of material such as Mylar ® film between which are disposed non-woven, force-bearing threads of Kevlar ® and like stretch resistant polymeric material, which threads are aligned along the principal stress lines to which the particular panel will be subjected when installed in the sail and subjected to the force of the wind.

The present invention provides a novel reinforced cloth which is of particular application in the fabrication of sailcloths and a method and apparatus for preparing said cloth.

SUMMARY OF THE INVENTION

It is an object of the invention to provide a reinforced cloth particularly adapted for use in the fabrication of sails.

It is a further object of the invention to provide a method of preparing a reinforced cloth particularly adapted for use in the fabrication of sails.

It is yet another object to provide an apparatus for the preparation of such a reinforced cloth.

These objects, and other objects which will become apparent from the description which follows, are achieved by the present invention. The invention comprises a novel reinforced laminated cloth comprising outer layers of material having sandwiched therebetween a layer of reinforcing material, the layer of reinforcing material preferably comprising a first layer of parallel spaced apart strands of stretch resistant material and a second layer of parallel spaced apart strands of stretch resistant material superimposed upon the first layer, the strands in the first layer being inclined at an angle to the strands in the second layer.

In another aspect, the invention comprises a method for the preparation of a reinforced cloth having the above characteristics, the method comprising feeding first and second webs of material from supply rolls towards a nip roll, coating the surface of at least one of the webs with adhesive prior to its arrival at the nip roll, feeding reinforcing strands between the first and second webs of material, each of the reinforcing strands, prior to entering the nip roll, preferably being passed through one of a plurality of apertures located at predetermined intervals on an endless belt in the shape of a loop disposed transversely to the direction of movement of the first and second webs of material, moving the endless belt continuously at a predetermined rate, continuously passing the first and second webs and the reinforcing strands through the nip roll, and continuously recovering the reinforced laminated cloth so produced.

In yet another aspect, the invention comprises an apparatus for carrying out the method of the invention.

BRIEF DESCRIPTION OF THE DRAWINGS

FIG. 4A is a detailed view of a portion of the reinforcing strand feeding component shown in FIG. 4.

FIG. 4B is a detailed view of another portion of the reinforcing strand feeding component shown in FIG. 4.

FIG. 5 is another view of part of the reinforcing strand feeding component of an apparatus in accordance with the invention.

FIG. 6 is a detailed partial view of a section of the reinforced strand feeding component of FIGS. 4 and 5.

FIG. 7 is a cross-sectional view taken along the line 7—7 in FIG. 4.

FIG. 8 is a cross-sectional view taken along line 8—8 in FIG. 4.

FIG. 9 is a front elevational view of the left end of the component shown in FIG. 8.

DETAILED DESCRIPTION OF THE INVENTION

The invention will now be described further with reference to the drawings.

Figure 1:
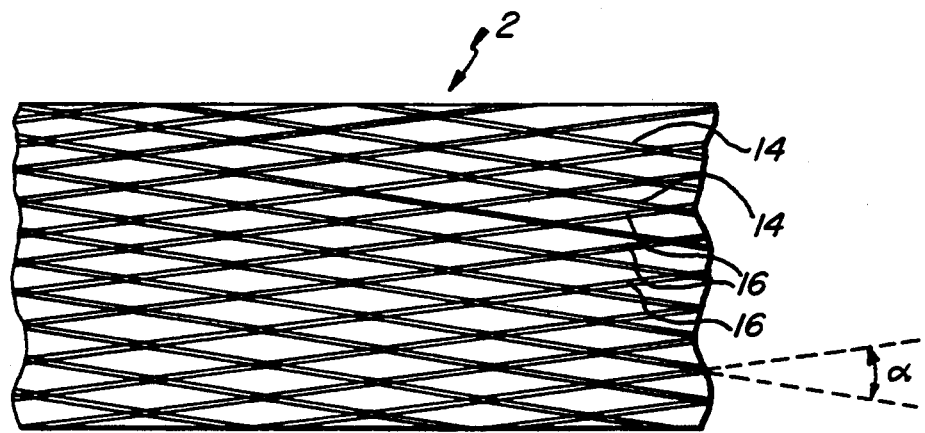
FIG. 1 is a plan view of one embodiment of a laminated cloth in accordance with the invention.
Figure 2:
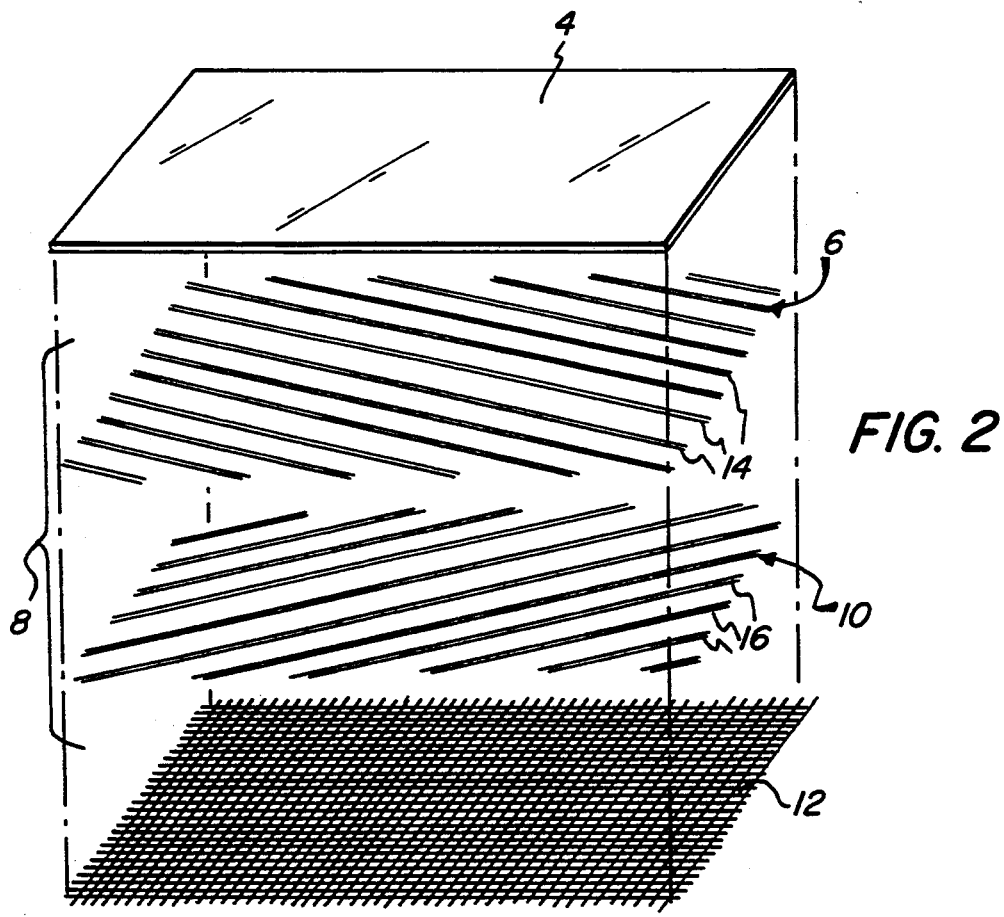
FIG. 2 is an exploded view of the laminated cloth of FIG. 1.

A reinforced laminated cloth (2) in accordance with the invention is shown in plan view in FIG. 1 and in exploded view in FIG. 2. As shown more particularly in the latter figure, the cloth (2) comprises a first outer layer (4), a layer (8) of reinforcing material, and a second outer layer (12).

First and second outer layers (4 and 12) may comprise a film of dimensionally stable resin having high stretch resistance; a woven, non-woven, warp-knit, or scrim fabric; a combination of at least two films, fabrics, or both; or a reinforced laminated cloth (2). Fabric outer layers advantageously provide a relatively soft and easy to handle laminated cloth; whereas, film outer layers require more careful handling. One advantage of film outer layers is their light weight and high stretch resistance which are of greatest importance in performance sailing. One advantage of fabric outer layers is their relatively higher durability and tear resistance as compared to film outer layers which make fabric outer layers easier to handle. Different combinations of outer layers may be used to maximize the performance characteristics and ease of handling of a given laminate.

As illustrated, first outer layer (4) comprises a film of dimensionally stable resin. Such films may be provided as drawn, oriented polyester films, e.g. polyethylene terephthalate, available from DuPont Company under the trademark Mylar ®. Other films having high tensile modulus are those sold under the trademark Tedlar ® by DuPont Company, and others fabricated from polymers such as nylon, polypropylene and the like. Advantageously, the films have a thickness of the order of about 0.25 mils to about 20 mils, preferably from about 0.5 mils to about 3 mils, and most preferably from about 1 to 2 mils.

As illustrated, second outer layer (12) comprises a fabric. The fabric employed as layer (12) is advantageously one in which the yarns are comprised of multiple fibers or monofilaments of synthetic materials such as those fabricated from polyamides illustrative of which 10 are nylon, Kevlar ®, and polyesters such as those available under the trademarks Dacron ®, Fortrel ® and the like, polyimides and polyamidimides.

Reinforcing layer (8) comprises at least one layer or warp of individual strands of fiber spaced apart from each other and aligned substantially in parallel. Further, for any reinforced laminated cloth (2) having one or more fabric outer layers, the warp of individual strands is substantially aligned with the warp or fill of the fabric.

Reinforcing layer (8) advantageously comprises, as illustrated, two reinforcing layers or warps (6 and 10) of individual strands of fiber spaced apart from each other and aligned substantially in parallel. For any reinforced laminated cloth (2) having one or more fabric outer layers, the warps of the individual strands are relatively aligned with the warp or fill of the fabric. Further, the strands (14) in layer (6) are all aligned in a direction which describes an acute angle (alpha) with respect to the direction in which the strands (16) in layer (10) are aligned. The angle (alpha) advantageously has a value which lies within the range of about 2° to about 90°, preferably within the range of about 4° to about 40°, and most preferably within the range of 6° to 20°.

The strands (14 and 16) of one or more reinforcing layers or warps (6 and 10) are each fabricated from synthetic polymeric fiber having high stretch resistance. By fiber having high stretch resistance is meant fiber having a tensile strength modulus of the order of at least about 5 grams/denier. Illustrative of such fibers are those fabricated from nylon, Kevlar ®, polyesters such as those available under the trademarks Dacron ®, Fortrel ® and the like, polyethylenes such as those available under the trademark Spectra ® from DuPont Company, polyimides and polyamidimides. In general the fibers employed as strands (14) and (16) have deniers in the range of about 20 to about 10,000, preferably within the range of about 200 to about 5000, and most preferably within the range of 400 to 3000.

Figure 3:
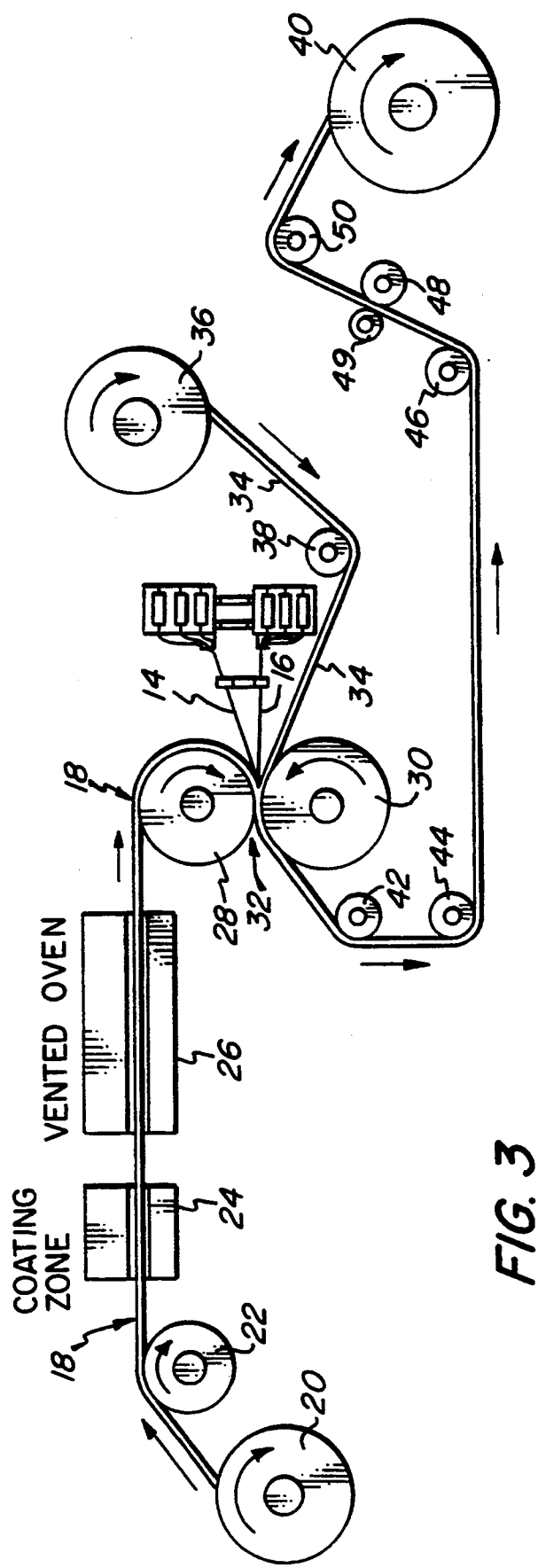
FIG. 3 is a schematic representation of an apparatus and process for the continuous manufacture of laminated cloth in accordance with the invention.

FIG. 3 is a schematic representation of a process and apparatus for the continuous fabrication of laminates in accordance with the invention. In accordance with the process a continuous web (18) fabricated from material such as those discussed in regard to outer layers (4 and 12) above is dispensed from feed roll (20) and fed via guide roll (22) through a coating zone (24) in which zone a thin film of adhesive solution such as a polyurethane adhesive is deposited on the surface of the web. The adhesive is evenly coated across the width of the web by means of a reverse roll or doctor blade to an evaporative depth of approximately 1 mil. The coated web is then passed continuously through a vented oven (26) in which the solvent in the adhesive solution is removed by evaporation. The coated web (18) is transported from the oven with the tacky, adhesive coated side upwards, to a heated roller (28) which, together with adjoining roller (30), forms a nip (32). Rollers (28) and (30) are adapted to move synchronously, by a motor (not shown), in the direction indicated by the arrows, and to draw through nip (32) the coated film (18), one or more warps of individual strands such as (14 and 16) discussed above in regard to reinforcing layer (8) and a second web (34) such as those discussed above in regard to outer layers (4 and 12) dispensed from feed roll (36) via tension bar (38). The method of dispensing the two warps of individual strands (14) and (16) to form a reinforced laminated cloth (2) as shown in FIG. 2 is described below with reference to FIGS. 4 through 10. The size of nip (32) is adjusted to provide sufficient pressure on the various layers to cause the adhesive on web (18) to penetrate the one or more warps of strands and bond the various layers together.

The heated roller (28) is maintained at a temperature such that the adhesive coating on web (18) will still flow when subjected to the pressure exerted in passage through the nip (32). Advantageously the temperature of the roller (28) is maintained in the range of about 100° C. to about 200° C. depending upon the particular adhesive employed. The temperature employed in any given instance is such as to maintain the adhesive at a temperature at which it will flow during passage through the nip roll.

After passage through the nip (32) the newly formed laminated cloth is wound continuously onto take-up roller (40) via guide rollers (42), (44), (46), (48), and (50). Guide roller (48) advantageously includes a score cutter (49) which trims the edges of the newly formed laminated cloth before it is wound onto take-up roller (40). The laminate is ultimately cut into appropriate lengths and configurations in order to be fashioned into a finished article such as a sail.

Figure 4:
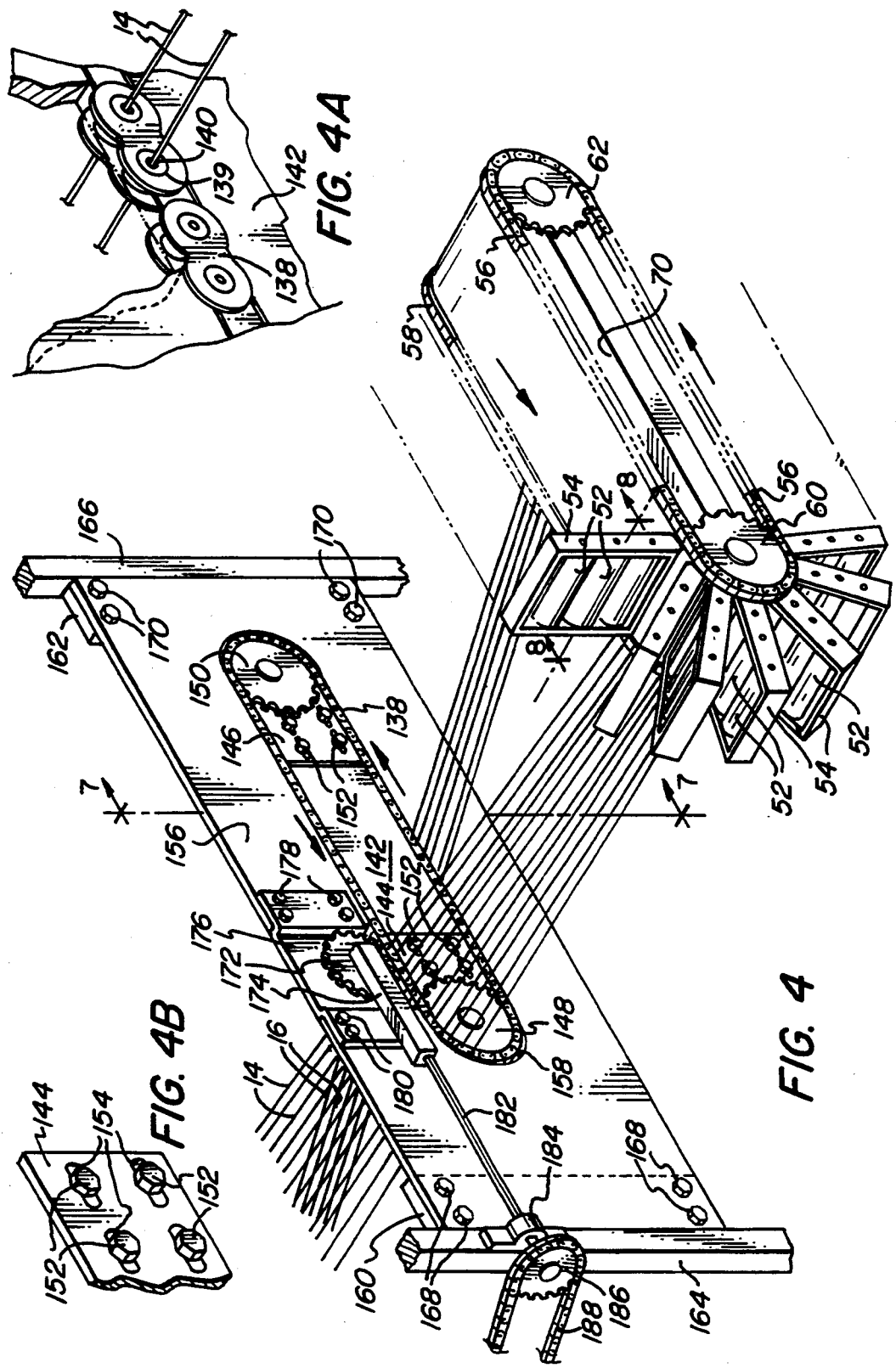
FIG. 4 is a perspective view of a reinforcing strand feeding component of an apparatus in accordance with the invention.

FIG. 4 shows a partial, perspective view of the means by which strands (14) and (16) are fed to nip (32) as shown in the schematic rendering in FIG. 3. Said strands are fed from individual bobbins (52) mounted in bobbin holding frames (54) which in turn are mounted on endless chain-link belts (56) and (58). Belt (56) is mounted on sprockets (60) and (62) and belt (58) is mounted on matching corresponding sprockets (60') and (62') not visible in FIG. 4. FIG. 6 illustrates the method of mounting the sprockets (60) and (60') on axle (66) disposed in axle housing (64) which is attached by bolts or like means (not shown) to plate (68) which is disposed vertically on the end of cross-bar (70). Cross-bar (70) is suspended from arm (71) attached to frame (73) and from a similar arm forming part of a frame at the other end (not shown) of cross-bar (70). The top surface of cross-bar (70) is provided with an elastomeric liner (72) preferably fabricated from Teflon or like material over which the chain-link belts (56) and (58) and bobbin holder frames (54) are free to be moved. A sprocket (74) mounted on the extension of axle (66) is connected by drive belt or chain (76) to sprocket (78) mounted on drive-shaft (80) which is connected to drive means (not shown). The chain-link belts (56) and (58) can thus be driven at a predetermined speed in the direction shown by arrows in both FIGS. 4 and 6.

The mode of assembling bobbins (52) in bobbin holder frames and dispensing strands (14) and (16) from said bobbins is shown in FIG. 8 which is a cross-sectional view taken along line 8—8 in FIG. 4. Bobbins (52) are each rotatably mounted with their central shafts (82) disposed on pins (84) which project horizontally from the rear wall (86) of frame (54). While 3 such bobbins are shown installed in frame (54), it is to be understood that this number of bobbins per frame is shown for purposes of illustration and that the invention is not limited to this particular number of bobbins per frame. The top (88) and base (90) of frame (54) are rigidly attached to rear wall (86). Front wall (92) is pivotally mounted on frame (54) by means of hinge (94) and held in place by thumb screw (96) the inner end (98) of the shaft of which is secured to the top edge of top (88) by a weld or like means. Front wall (92) is provided with apertures (100) fitted with liners (101) through which strands (102), (104), and (106) are fed from bobbins (52) to a strand tensioning device shown overall as (108). The latter is mounted on platform (110) which forms a lower extension of front plate (92). Each of strands (102), (104), and (106) is fed through an aperture (112) in the case of strand (104) disposed in upright (114) and provided with sleeve (116) which is fabricated from Teflon or like material. Thereafter the strand (104) is fed through tension adjusting device (118) fitted with liner (122) of Teflon or like material. Thumbscrew (120) is adjusted to impart required tension to the strand (104) passing through device (118). Strand (104) then passes through aperture (126) fitted with liner (128) of the same or similar material to that used in liner (122) and sleeve (116) and mounted in column (124) projecting upwardly from platform (110). In the same manner strands (102) and (106) are fed through identical tension adjusting means mounted alongside device (118).

Bobbin holder frame (54) is mounted on chain-belts (56) and (58) via brackets (130) and (130') as shown in FIG. 8. FIG. 9 shows a frontal view of the front plate (92) of bobbin frame (54) the same numbering of common elements being used in both FIGS. 8 and 9.

Figure 10:
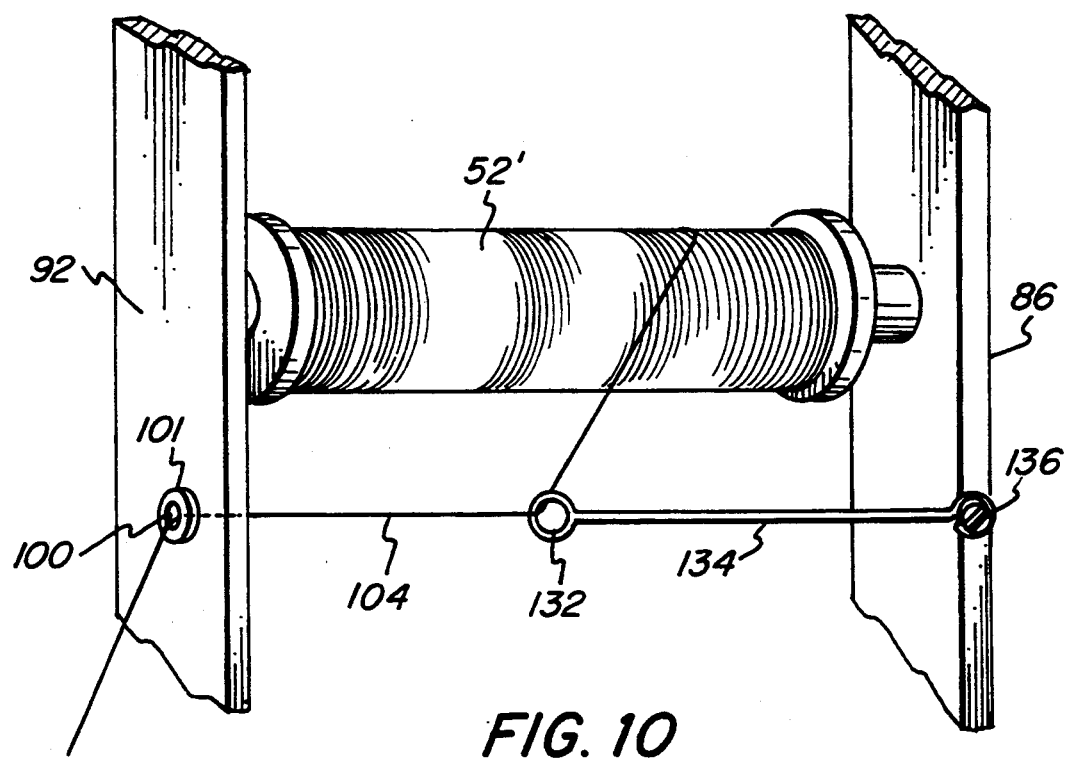
FIG. 10 is a partial perspective view of a bobbin with strand guide means employed in an apparatus in accordance with the invention.

FIG. 10 illustrates a particular embodiment of a means for facilitating the dispensing of strands from a bobbin shown in FIG. 8. In the embodiment of FIG. 10 the strand (104) is dispensed from the bobbin (52'), which is free to rotate about its longitudinal axis, via an eyelet (132) mounted, about midway along the length of bobbin (52'), on rod (134) which is secured by screw (136) or like means to the rear wall (86) of frame (54). After passage through eyelet (132) the strand (104) is then passed, as before, through sleeve (101) in aperture (100) in the front wall (92) of frame (54). It is found that this particular embodiment shown in FIG. 10 serves to facilitate smooth, steady dispensing of strand (104) from the bobbin.

FIG. 5 is a partial perspective view of the bobbin holder frames mounted on associated chain-link belts as shown in FIG. 4, but taken from the opposite side of the view shown in FIG. 4. The same numbering of common elements is used in both FIGURES.

Referring again to FIG. 4, the plurality of strands being dispensed from bobbins (52), after passing through tension adjusting devices (118) as described above, each then pass through one of the apertures (140) fitted with sleeve (139) in endless chain-link belt (138). An enlarged partial cutaway view of a portion of the latter belt is shown in FIG. 4A. Belt (138) is mounted on, and rides on the peripheral edges of, blade (142) which is provided with end plates (144) and (146) on which are mounted sprockets (148) and (150), respectively. The end plates (144) and (146) are adjustably mounted on the ends of blade (142) by fastening bolts (152) which cooperate with elongated slots in plate (144) as shown in detail in FIG. 4B; similar adjustable fastening means are provided on plate (146). While one edge of belt (138) rides on the periphery of blade (142) and sprockets (148) and (150), the other edge rides on the edges of the cutout portion (158) of plate (156) which cutout portion (158) conforms to the shape of the periphery of belt (138) in its operational configuration. Plate (156) is supported at either end by attachment to projections (160) and (162) from frame members (164) and (166) by means of bolts (168) and (170) or like means.

FIG. 7, which is a cross-sectional view taken along lines 7—7 in FIG. 4, further illustrates the manner in which belt (138) is mounted on the abutting edges of blade (142) and plate (156).

Chain-belt (138) is driven by drive-sprocket (172) mounted on insert plate (176) which is set in a corresponding cutout portion of plate (156) and held in place therein by bolts (178) and (180). Drive-sprocket (172) is driven via associated gearbox (174) by drive shaft (182) supported by bearing (184) mounted on frame (164). Sprocket (186) mounted on the end of drive shaft (182) is driven by chain (188) which is connected to the same power source (not shown) as drive shaft (80) which drives belts (56) and (58) (see FIG. 6). Chain-belt (138) is thereby driven in the direction shown by arrows in FIG. 4 at the same speed and in the same direction in synchronism with chain-belts (56) and (58). In this manner the strands (14), which are being passed through apertures in that portion of belt (138) which at any given moment forms the upper half thereof, are being pulled in a direction at right angles to the direction of travel of webs (18) and (34) (see FIG. 3). The strands (16), which are being passed through apertures in that portion of belt (138) which at any given moment form the lower half thereof, are being pulled in a direction which is also at right angles to the direction of travel of said webs, but which is opposite to the direction in which the strands passing through the upper half of the belt are being pulled. In this regard, the strands pulled through both the upper and lower half of the belt are arrayed at an angle of about 1° to about 45°, preferably about 2° to about 20°, and most preferably 3° to 10° to the longitudinal axis of the webs.

As will be apparent to one skilled in the art, the angle (alpha) (see FIG. 1) which the strands oriented in the one direction make with those oriented in the other in the finished laminate can be varied in any desired manner by adjusting the rate at which belt (138) is being moved in synchronism with belts (56) and (58).

The particular embodiments shown in FIGS. 3–10 and the discussion of these embodiments set forth above have been given for purposes of illustration only and are not to be construed as limiting. The various embodiments can be modified in various ways, which will be readily apparent to one skilled in the art, without departing from the scope of the present invention.

The method and apparatus of the invention can be employed to produce the novel laminated reinforced fabric of the invention. The latter fabric can be utilized in the fabrication of a wide variety of articles such as sails, tarpaulins, awnings, and the like. The laminated cloth of the invention can also be reinforced further by employing it as the web used as one of the outer layers in the continuous fabrication of a reinforced laminate in accordance with the present invention or, alternatively, in the continuous process described in my earlier U.S. Pat. No. 4,679,519.

What is claimed is:

1. A reinforced laminated sailcloth comprising outer layers of material having sandwiched therebetween a layer of reinforcing material, said layer of reinforcing material comprising a first layer of substantially parallel spaced apart strands of stretch resistant material and a separate second layer of substantially parallel spaced apart strands of stretch resistant material, the strands in said first layer being arrayed at a first angle to said strands in said second layer;

said reinforced laminated sailcloth formed by a method comprising the steps of:

applying adhesive to one of said outer layers of material, introducing said first layer of strands between said outer layers of material at a second angle of between about 2° and 20° to a longitudinal axis of the outer layers of material, substantially simultaneously introducing said second layer of strands between said outer layers of material at a third angle of between about 2° and 20° to a longitudinal axis of the outer layers of material, and pressing said outer layers of material together to adhere said first and second strand layers therebetween.

2. A reinforced laminated sailcloth according to claim 1 wherein said strands in said first and said second layers are fabricated from a stretch resistant polymeric material.

3. A reinforced laminated sailcloth according to claim 1 wherein said strands in said first and second layers are fabricated from aramid.

4. A reinforced laminated sailcloth according to claim 1 wherein said outer layers are formed from a material selected from the group consisting of film, fabric, at least two fabrics, and reinforced laminated cloth.

5. A reinforced laminated cloth according to claim 1 wherein said strands in said second layer are arrayed at an opposite angle to the longitudinal axis from said strands in said first layer.

6. A reinforced laminated cloth according to claim 1 wherein said first angle is between about 4° to about 40°.

7. A reinforced laminated cloth according to claim 1 wherein said first angle is between 6° to 20°.

8. A reinforced laminated cloth according to claim 1 wherein said outer layers are formed from a film of dimensionally stable resin.

9. A reinforced laminated cloth according to claim 1 wherein said outer layers are formed from a fabric, said fabric aligned so that its warp threads substantially bisect said first angle.

10. A reinforced laminated cloth according to claim 1 wherein one of said outer layers is formed from a film of dimensionally stable resin and the other of said outer layers is formed from a fabric, said fabric aligned so that its warp threads substantially bisect said first angle.

11. A reinforced laminated cloth according to claim 1 wherein at least one of said outer layers is formed from a reinforced laminated cloth having at least one layer of strands of a stretch resistant material.

12. A substantially continuously fabricated reinforced laminated sailcloth comprising outer layers of material formed from substantially continuous webs, said outer layers having sandwiched therebetween a layer of reinforcing material, said layer of reinforcing material comprising two separate layers of substantially parallel spaced apart strands of stretch resistant material, said layers arrayed at opposite angles of between about 2° and about 20° to a longitudinal axis of the substantially continuous webs;

said reinforced laminated sailcloth made by a method comprising the steps of:
feeding said webs toward a nip roll,
coating one of said webs with adhesive prior to its arrival at the nip roll,
feeding said separate strand layers between said webs at angles of between about 2° and about 20° to the longitudinal axis of said webs, and
substantially continuously passing said webs and said strand layers through the nip roll to press the substantially continuous webs together.

13. The substantially continuously fabricated reinforced laminated sailcloth according to claim 12 wherein said strand feeding step comprises passing each of said strands through one of a plurality of apertures located along an endless belt disposed transversely to the direction of feeding of said webs, and including the step of substantially continuously moving said endless belt.

14. The substantially continuously fabricated reinforced laminated sailcloth according to claim 12 wherein said strands are arrayed at an angle of between about 3° and 10° to the longitudinal axis of the webs.

15. The substantially continuously fabricated reinforced laminated sailcloth according to claim 14 wherein said two layers of parallel spaced apart strands are directly superimposed one upon the other.

16. The substantially continuously fabricated reinforced laminated sailcloth according to claim 14 wherein said strands are fabricated from aramid.

17. The substantially continuously fabricated reinforced laminated sailcloth according to claim 14 wherein at least one of said substantially continuous webs comprises a film.

18. The substantially continuously fabricated reinforced laminated sailcloth according to claim 14 wherein at least one of said substantially continuous webs comprises a fabric.

19. The substantially continuously fabricated reinforced laminated sailcloth according to claim 13 wherein said feeding step comprises alternately feeding strands of each of said separate strand layers at each of said opposite angles to the longitudinal axis of the webs.

* * * * *